United States Patent
Kuji et al.

(10) Patent No.: US 10,612,164 B2
(45) Date of Patent: Apr. 7, 2020

(54) METHOD OF CLEANING OXIDATION OVEN AND METHOD OF PRODUCING OXIDIZED FIBER, CARBON FIBER, AND GRAPHITIZED FIBER

(71) Applicant: Toray Industries, Inc., Tokyo (JP)

(72) Inventors: Yusuke Kuji, Iyo-gun (JP); Wataru Yamamoto, Nagoya (JP); Masaomi Uchiyama, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/468,135

(22) PCT Filed: Jan. 29, 2018

(86) PCT No.: PCT/JP2018/002666
§ 371 (c)(1),
(2) Date: Jun. 10, 2019

(87) PCT Pub. No.: WO2018/147107
PCT Pub. Date: Aug. 16, 2018

(65) Prior Publication Data
US 2020/0071856 A1    Mar. 5, 2020

(30) Foreign Application Priority Data
Feb. 8, 2017 (JP) ................. 2017-020962

(51) Int. Cl.
*D01F 9/22* (2006.01)
*B08B 9/08* (2006.01)
(Continued)

(52) U.S. Cl.
CPC .............. *D01F 9/22* (2013.01); *B08B 9/08* (2013.01); *C01B 32/205* (2017.08);
(Continued)

(58) Field of Classification Search
CPC ...... D01F 9/82; D01F 9/22; D01F 9/32; C01B 32/205; C11D 11/0041; B08B 9/08
See application file for complete search history.

(56) References Cited

U.S. PATENT DOCUMENTS 9,061,328 B2 * 6/2015 Detyens, Jr. ............ B24C 3/325
2015/0274860 A1 10/2015 Sako et al.

FOREIGN PATENT DOCUMENTS

JP     8-311723 A    11/1996
JP     11-188302 A    7/1999
(Continued)

OTHER PUBLICATIONS

Office Action dated Aug. 12, 2019, of counterpart Korean Application No. 10-2019-7014589, along with an English translation.

*Primary Examiner* — Richard M Rump
(74) *Attorney, Agent, or Firm* — DLA Piper LLP (US)

(57) ABSTRACT

A method of cleaning an oxidation oven that subjects a polyacrylonitrile-based precursor fiber for carbon fiber to an oxidation treatment in an oxidizing atmosphere, wherein the oxidation oven has a mechanism for circulating an oxidizing gas internally, the method including the steps of: causing a liquid to come in contact with dust adhering to a wall surface of the oxidation oven so that pressure in a direction perpendicular to the wall surface is 2 MPa or more; discharging the liquid out of the oxidation oven to discharge dust peeled off from the wall surface out of the oxidation oven; and circulating an oxidizing gas having a temperature of 40° C. or higher in the oxidation oven.

7 Claims, 6 Drawing Sheets

(51) Int. Cl.
*C11D 11/00* (2006.01)
*D01F 9/32* (2006.01)
*C01B 32/205* (2017.01)
*C01B 32/05* (2017.01)

(52) U.S. Cl.
CPC ............ *C11D 11/0041* (2013.01); *D01F 9/32* (2013.01); *C01B 32/05* (2017.08)

(56) References Cited

FOREIGN PATENT DOCUMENTS

| | | |
|---|---|---|
| JP | 2001-316946 A | 11/2001 |
| JP | 2008-231611 A | 10/2008 |
| JP | 2009-196882 A | 9/2009 |
| JP | 2012-201997 A | 10/2012 |
| KR | 10-2015-0044942 A | 4/2015 |

\* cited by examiner

METHOD OF CLEANING OXIDATION OVEN AND METHOD OF PRODUCING OXIDIZED FIBER, CARBON FIBER, AND GRAPHITIZED FIBER

TECHNICAL FIELD

This disclosure relates to a method of cleaning an oxidation oven that subjects a precursor fiber for carbon fiber to oxidation with an oxidizing gas to produce an oxidized fiber.

BACKGROUND

A carbon fiber is useful as a reinforcing material for various materials because it is excellent in specific strength, specific modulus, heat resistance, and chemical resistance. The carbon fiber is used in a wide range of fields such as aerospace applications, leisure applications, and general industrial applications. Since the carbon fiber is often used in places where strength is required, the carbon fiber needs to uniformly and stably have extremely high properties, that is, requires excellent high quality.

Generally, as a method of producing a carbon fiber from a polyacrylonitrile-based fiber, the following method has been known. A fiber obtained by bundling several thousands to several tens of thousands of single fibers made of a polyacrylonitrile copolymer (hereinafter abbreviated as a precursor fiber for carbon fiber) is fed into an oxidation oven, and exposed to hot air having an oxidizing atmosphere such as air heated to 200 to 300° C., to subject the fiber to a heat treatment (oxidation treatment). Then, the obtained oxidized fiber is fed into a carbonization furnace, to subject the oxidized fiber to a heat treatment (precarbonization treatment) in an inert gas atmosphere at 300 to 1000° C. Then, the oxidized fiber is subjected to a heat treatment (carbonization treatment) in a carbonization furnace filled with an inert gas atmosphere of 1000° C. or higher. The oxidized fiber, which is an intermediate material, is widely used as a material for flame-retardant woven fabrics, taking advantage of its incombustible performance.

In the producing step of the carbon fiber, a silicone based oil agent is often used for the precursor fiber for carbon fiber to avoid the adhesion of the oxidized fibers.

Meanwhile, a hot air circulation type oxidation oven is widely used for an oxidation treatment of an industrial production scale. The hot air circulation type oxidation oven constitutes a hot air circulation system including a heat treatment chamber for subjecting a precursor fiber for carbon fiber to an oxidation treatment, and a hot air circulation path for heating and circulating hot air. Since the hot air can be repeatedly used by the hot air circulation system, the hot air circulation type oxidation oven can advantageously reduce the loss of thermal energy.

However, the hot air circulation type oxidation oven has a disadvantage that impurities such as dust are apt to stay in the hot air in the oxidation oven for a long period of time because the impurities staying in the hot air are less likely to be discharged out of the hot air circulation system. In particular, the dust generated from the silicone based oil agent applied to the precursor fiber for carbon fiber accumulates in the oxidation oven, and also adheres to the precursor fiber for carbon fiber during the oxidation treatment. The adhesion point of the dust adhering to the precursor fiber becomes the generating point of fuzz and single yarn break in the subsequent carbonization treatment, which causes significant deterioration in quality of the obtained carbon fiber.

Examples of the dust staying in the oxidation oven include aggregates of oil agent components other than the silicone oil agent, dust adhering to the precursor fiber for carbon fiber and carried from the outside of the oxidation oven, dust contained in outside air flowing into the oxidation oven, and dust made of a composite thereof in addition to dust derived from the silicone based oil agent.

If the dust stays in the oxidation oven, the quality of the carbon fibers obtained as described above is significantly deteriorated so that the carbon fiber cannot be stably produced. Furthermore, when a porous plate for rectifying a velocity is provided on a blowout surface of a hot air blowout port, the porous plate is clogged and blocked, which causes the circulation of the hot air to be delayed. If the circulation of the hot air in the heat treatment chamber is delayed, the heat removal of the precursor fiber for carbon fiber is not smoothly performed, which induces the yarn break of the precursor fiber for carbon fiber. The broken precursor fiber for carbon fiber is tangled with other precursor fiber for carbon fiber, to induce the yarn break of a precursor fiber for carbon fiber traveling in other traveling region. This leads to a fire and the like in the worst case, which impedes a stable operation of the oxidation oven.

Therefore, the conventional oxidation oven causes difficulties for a long-time continuous operation, and makes it necessary to frequently stop the operation to clean the inside of the oxidation oven, which leads to inhibition of improving the production efficiency of oxidized fiber. The maintenance cost required to clean the oxidation oven is great. In addition, while the oxidation oven becomes larger with the expansion of the amount of production in recent years, the structure in the oxidation oven becomes complicated to reduce velocity mottle in the oxidation oven for the purpose of producing a high-quality oxidized fiber and carbon fiber, which makes it difficult for operators to directly enter and completely clean all flow channels through which the hot air is circulated.

In the hot air circulation type oxidation oven, improvement in production efficiency and reduction in maintenance cost depend on how to reduce the dust in the oxidation oven. To reduce the dust, in addition to removal of the generation factors of the dust or discharge of the generated dust from the hot air circulation system and the like, efficient removal of the dust adhering to the inside of the oxidation oven can be considered.

To address this problem, for example, Japanese Patent Laid-Open Publication No. 2001-316946 proposes an oxidation oven including a water spray nozzle and a drainage port provided in the upper part of a rectifying plate of the oxidation oven to clean and remove dust adhering to the rectifying plate. That oxidation oven eliminates the need to manually spray water toward the blocked rectifying plate to which the dust adheres, to provide easy cleaning. Japanese Patent Laid-Open Publication No. 2012-201997 proposes an oxidation oven having an aggregation mechanism which takes in hot air from a hot air circulation path, aggregates impurities, and returns the hot air to the hot air circulation path again. That oxidation oven can efficiently remove the dust from the hot air, to allow the operability to be improved. Furthermore, Japanese Patent Laid-Open Publication No. 2008-231611 proposes an oxidation oven which discharges an oxidizing gas passing through a travelling region for a precursor fiber for carbon fiber at an initial stage of oxidation where dust is most generated, out of the oxidation oven without circulating the oxidizing gas. That oxidation oven can greatly reduce the dust adhering to the inside of the oxidation oven, which can provide a continuous operation for a long time. Japanese Patent Laid-Open Publication No. 8-311723 proposes an oxidation oven including an exhaust port provided in a hot air circulation path. According to that oxidation oven, hot air of a hot air circulation system is exhausted from the exhaust port out of the hot air circulation system before re-operation after the inside of the oxidation oven is cleaned, whereby the dust remaining in the oxidation oven can be reduced, which makes it possible to prevent quality of an oxidized fiber from deteriorating initially after the re-operation.

However, the oxidation oven described in JP '946 has an effect of removing a specific amount of the adhering dust, but only the water spraying causes insufficient cleaning and removing effects.

The oxidation oven described in JP '997 has an effect of reducing the dust adhering to the inside of the oxidation oven, but the treatment of the whole hot air in the aggregation device leads to upsizing of equipment, which is not preferable also from the viewpoint of the loss of thermal energy. Therefore, after all, a structure for treating only a part of the hot air becomes realistic, and the adhesion of the dust in the oxidation oven cannot be completely prevented. Since it is necessary for the operators to periodically enter the oxidation oven for cleaning, an efficient cleaning method is still required.

In the oxidation oven described in JP '611, the hot air passing through the region where the dust is most generated is discharged out of the oxidation oven, whereby the oxidation oven has an effect of reducing the dust adhering to the inside of the oxidation oven. However, the discharge of the hot air is not preferable from the viewpoint of the loss of thermal energy. Since the adhesion cannot be completely prevented, it is necessary for the operators to periodically enter the oxidation oven for cleaning so that an efficient cleaning method is still required.

The oxidation oven described in JP '723 makes it possible to prevent quality of the oxidized fiber from deteriorating initially occurring after the re-operation of the oxidation oven, but the dust in the oxidation oven cannot be completely removed. Therefore, the cleaning of the inside of the oxidation oven is still required, and an efficient cleaning method is also required.

It could therefore be helpful to provide a method of cleaning an oxidation oven, which can obtain a high-quality carbon fiber immediately after re-operating the oxidation oven, can easily clean the inside of the oxidation oven, and can reduce a period in which production is stopped, and a method of producing an oxidized fiber and a method of producing a carbon fiber including the step of cleaning the oxidation oven using the cleaning method.

SUMMARY

We thus provide:

(1) A method of cleaning an oxidation oven for subjecting a polyacrylonitrile-based precursor fiber for carbon fiber to an oxidation treatment in an oxidizing atmosphere, wherein:

the oxidation oven has a mechanism for circulating an oxidizing gas internally; and the method comprising the steps of:

causing a liquid to come in contact with dust adhering to a wall surface of the oxidation oven so that pressure in a direction perpendicular to the wall surface is 2 MPa or more;

discharging the liquid out of the oxidation oven to discharge the dust peeled off from the wall surface out of the oxidation oven; and circulating an oxidizing gas having a temperature of 40° C. or higher in the oxidation oven.

(2) The method of cleaning an oxidation oven according to the above (1), wherein, after the oxidizing gas is circulated, the oxidizing gas is discharged out of the oxidation oven to further discharge the dust peeled off from the wall surface out of the oxidation oven.

(3) The method of cleaning an oxidation oven according to the above (2), wherein, after the oxidizing gas is circulated in the oxidation oven, a direction or velocity of the oxidizing gas in the oxidation oven is switched, and thereafter the dust peeled off from the wall surface is discharged out of the oxidation oven.

(4) The method of cleaning an oxidation oven according to any one of the above (1) to (3), wherein the temperature of the oxidizing gas circulated in the oxidation oven is 80° C. or higher.

(5) A method of producing an oxidized fiber, comprising the steps of:

cleaning an oxidation oven according to the method of cleaning an oxidation oven according to any one of the above (1) to (4); and subjecting a polyacrylonitrile-based precursor fiber for carbon fiber to an oxidation treatment at a maximum temperature of 200 to 300° C. in an oxidizing atmosphere in the oxidation oven.

(6) A method of producing a carbon fiber, comprising the steps of:

producing an oxidized fiber according to the method of producing an oxidized fiber according to the above (5);

subjecting the oxidized fiber to a precarbonization treatment at a maximum temperature of 300 to 1000° C. in an inert gas to produce a precarbonized fiber; and subjecting the precarbonized fiber to a carbonization treatment at a maximum temperature of 1000 to 2000° C. in an inert gas.

(7) A method of producing a graphitized fiber, comprising the steps of:

producing a carbon fiber according to the method of producing a carbon fiber according to the above (6); and subjecting the carbon fiber to a graphitization treatment at a maximum temperature of 2000 to 3000° C. in an inert gas.

Our method of cleaning an oxidation oven can stably provide a high-quality oxidized fiber, and enables a long-term continuous operation of the oxidation oven. The method provides easy cleaning of the inside of the oxidation oven while the oxidation oven is stopped, to make it possible to reduce time and effort required for cleaning, whereby a period in which production is stopped can be reduced.

DESCRIPTION OF REFERENCE SIGNS

Figure 1:
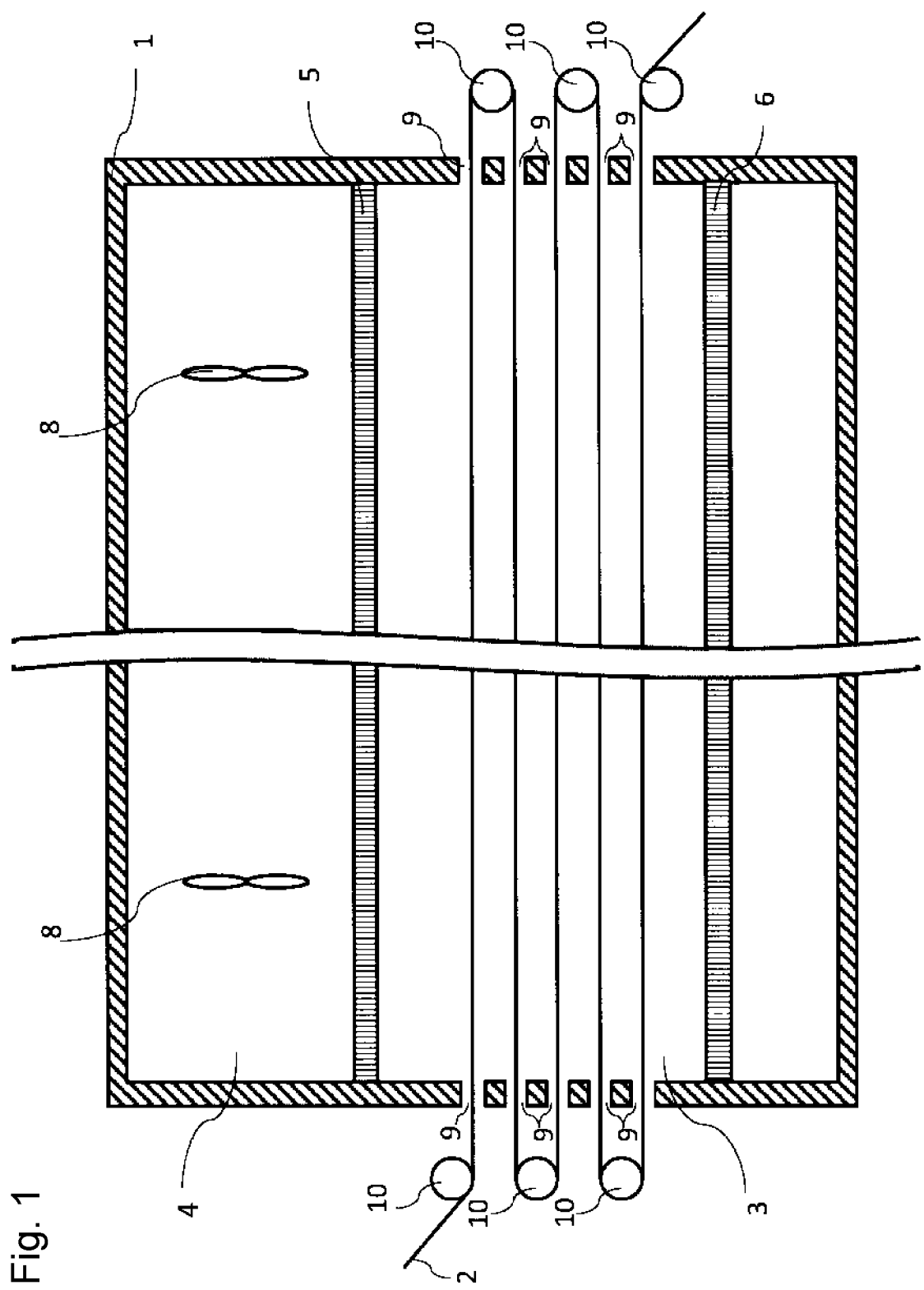
FIG. 1 is a schematic side view showing an oxidation oven.

1: Oxidation oven
2: Precursor fiber for carbon fiber

3: Heat treatment chamber
4: Hot air circulation path
5: Hot air blowout port
6: Hot air discharge port
7: Heater
8: Blower
9: Slit
10: Guide roll
11: Cleaning nozzle
12: Cleaning device
13: Exhaust port
14: Switching valve
15: Air supply port
16: Exhaust fan
17: Exhaust gas combustion device

DETAILED DESCRIPTION

Figure 2:
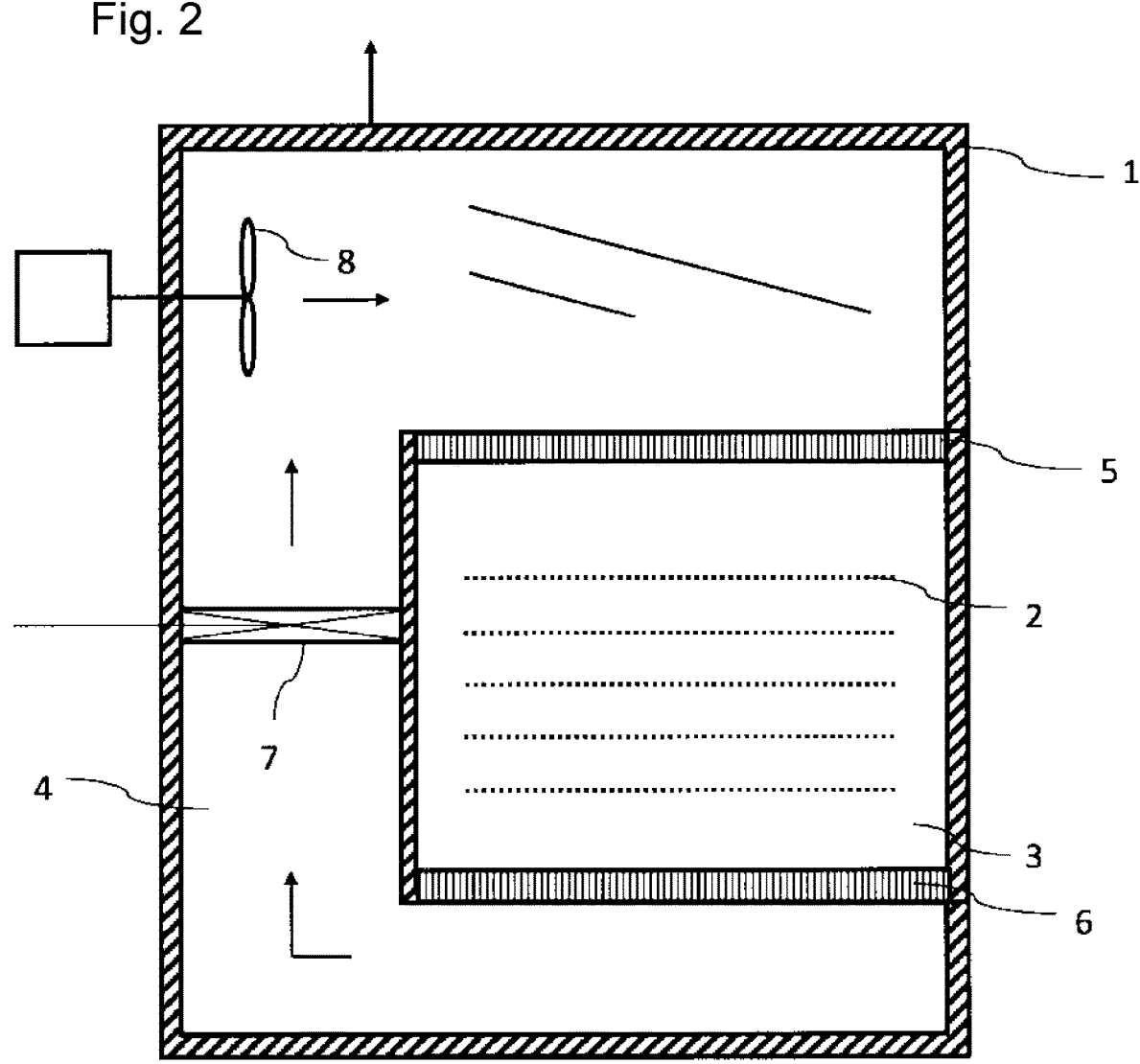
FIG. 2 is another schematic side view showing an oxidation oven.

Our method cleans an oxidation oven that subjects a polyacrylonitrile-based precursor fiber for carbon fiber to an oxidation treatment in an oxidizing atmosphere, and is carried out in the oxidation oven having a mechanism for circulating an oxidizing gas internally. An oxidation oven 1 includes a hot air circulation system and a discharging means. As shown in FIGS. 1 and 2, the hot air circulation system includes a heat treatment chamber 3 for blowing hot air to a precursor fiber for carbon fiber 2 traveling while being turned in a multistage traveling region to subject the precursor fiber for carbon fiber 2 to an oxidation treatment, and a hot air circulation path 4 for blowing the hot air into the heat treatment chamber 3 and for discharging the hot air out of the heat treatment chamber 3 to circulate the hot air in the hot air circulation system.

Figure 5:
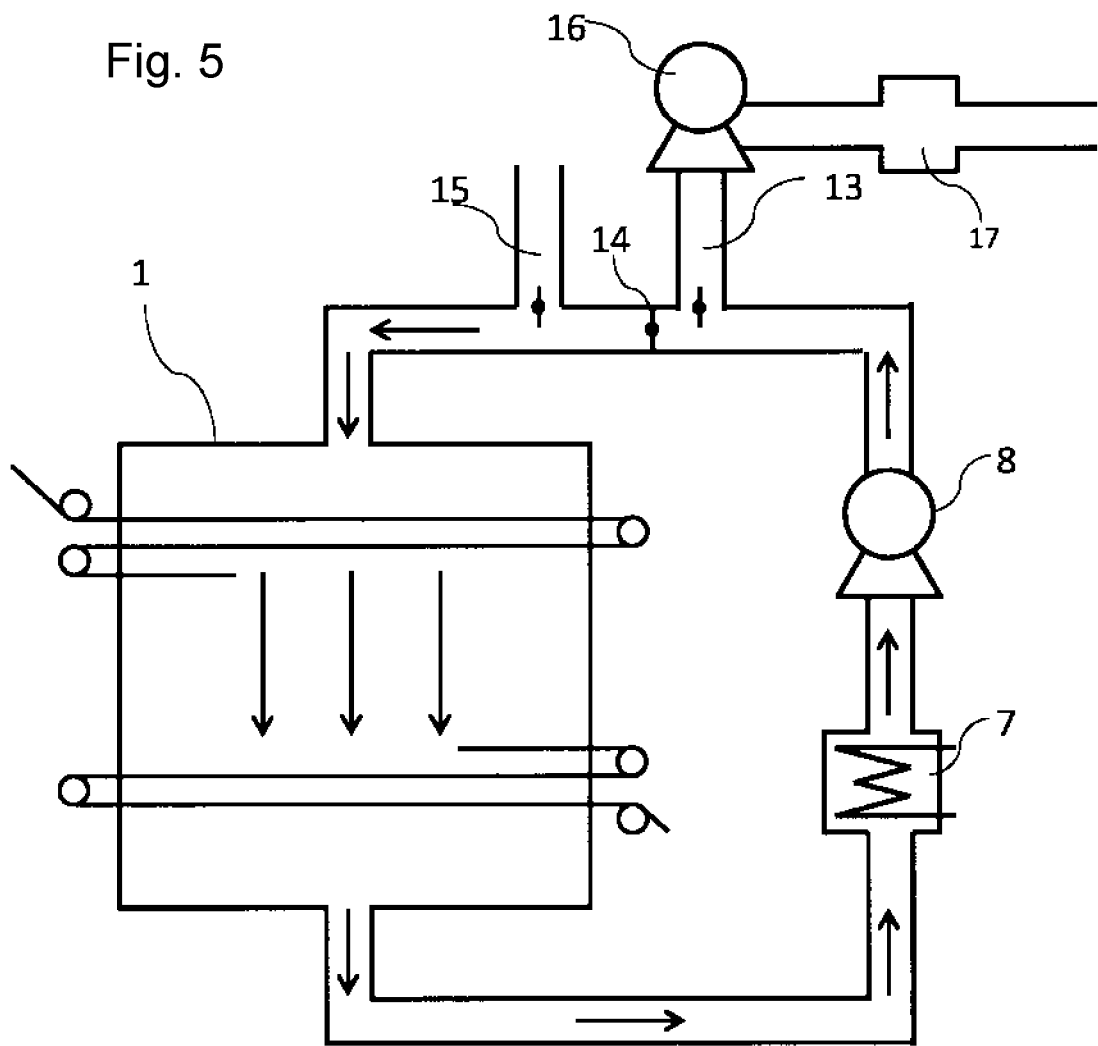
FIG. 5 is a schematic view showing an exhaust path for discharging adhering dust out of the oxidation oven.

In the heat treatment chamber 3, a hot air blowout port 5 for blowing the hot air into the traveling region of the precursor fiber for carbon fiber 2, and a hot air discharge port 6 for discharging the hot air from the traveling region of the precursor fiber for carbon fiber 2 out of the heat treatment chamber 3 are provided. A heater 7 for heating the hot air, and a blower 8 for controlling the velocity of the hot air are provided in the middle of the path of the hot air circulation path 4. As shown in FIG. 5, to suppress the concentration of a gas such as HCN generated from the precursor fiber for carbon fiber 2 to a predetermined value or less, an exhaust fan 16 for discharging the hot air containing the gas out of the hot air circulation system, and an exhaust gas combustion device 17 for treating the gas may be provided.

The precursor fiber for carbon fiber 2 is fed into the heat treatment chamber 3 from a slit 9 provided in the side wall of the heat treatment chamber 3 of the oxidation oven 1, linearly travels in the heat treatment chamber 3, and then fed out of the heat treatment chamber 3 from a slit in an opposite side wall once. Thereafter, the precursor fiber for carbon fiber 2 is turned by a guide roll 10 provided on a side wall outside the heat treatment chamber 3, and fed into the heat treatment chamber 3 again. Thus, the precursor fiber for carbon fiber 2 is turned plural times in the traveling direction by the plurality of guide rolls 10, whereby the precursor fiber for carbon fiber 2 is repeatedly fed into and out of the heat treatment chamber 3 plural times, to move from the top to the bottom in FIG. 1 as a whole at a multistage in the heat treatment chamber 3. The moving direction may be from the bottom to the top. The number of turnings of the precursor fiber for carbon fiber 2 in the heat treatment chamber 3 is not particularly limited, and is appropriately designed according to the scale of the oxidation oven 1 and the like. The guide rolls 10 may be provided in the heat treatment chamber 3.

While the precursor fiber for carbon fiber 2 travels in the heat treatment chamber 3 while being turned, the precursor fiber for carbon fiber 2 is subjected to an oxidation treatment by the hot air blown from the hot air blowout port 5 to provide an oxidized fiber. Although not shown, the precursor fiber for carbon fiber 2 has a wide sheet-like form in which a plurality of precursor fiber for carbon fibers 2 are aligned in parallel in a direction perpendicular to the paper surface.

The hot air blowout port 5 preferably has a pressure loss provided by disposing a resistor such as a porous plate and a rectifying member such as a honeycomb (both not shown) on a blowout surface thereof. The hot air blown into the heat treatment chamber 3 is rectified by the rectifying member, whereby the hot air having a more uniform velocity can be blown into the heat treatment chamber 3.

As with the hot air blowout port 5, the hot air discharge port 6 may have a pressure loss provided by disposing a resistor such as a porous plate on a suction surface thereof, which is appropriately determined as necessary.

The hot air blown into the heat treatment chamber 3 by the hot air blowout port 5 heats the precursor fiber for carbon fiber 2 while flowing downward from the above in the heat treatment chamber 3, that is, toward the discharge port 6 side. The hot air reaching the downstream side is discharged out of the heat treatment chamber 3 by the hot air discharge port 6, and guided to the hot air circulation path 4. The hot air is then heated to a desired temperature by the heater 7 provided in the middle of the hot air circulation path 4, and the velocity of the hot air is controlled by the blower 8. The hot air is blown into the heat treatment chamber 3 from the hot air blowout port 5 again. Thus, in the oxidation oven 1, hot air having a predetermined temperature and velocity can be flowed into the heat treatment chamber 3 by the hot air circulation system including the heat treatment chamber 3 and the hot air circulation path 4. The direction of the hot air is not limited to a direction from the top to the bottom of the heat treatment chamber 3. The hot air may be flowed in a direction from the bottom to the top, or in a direction parallel to a traveling yarn.

The heater 7 used in the oxidation oven 1 is not particularly limited as long as it has a desired function. For example, a known heater such as an electric heater may be used. The blower 8 is not particularly limited as long as it has a desired function. For example, a known blower such as an axial flow fan may be used.

A volatile substance of a silicone based oil agent from the precursor fiber for carbon fiber 2 is generated immediately after the precursor fiber for carbon fiber 2 is fed into the heat treatment chamber 3. Since the generated volatile substance is less likely to be discharged from the circulation system including the heat treatment chamber 3 and the hot air circulation path 4, the dust generated from the volatile substance adheres to the inside of the circulation system. The dust adhering to the wall surface of the oxidation oven is peeled off by vibration or impact when the amount of the dust is a certain level or more, and transported to a place where the pressure loss of the hot air blowout port 5 and the like is large by circulating hot air, which causes the blockage. When the floating dust comes in contact with the traveling yarn, the single yarn break occurs as its generating point, which leads to significant deterioration in quality of the carbon fiber. Therefore, it is effective to clean not only the blocked hot air blowout port 5 but also the entire circulation system to stably produce a high-quality carbon fiber and prevent the porous plate from being blocked for a long period of time. It is preferable to clean all the wall surfaces coming in contact with the circulating gas.

The cleaning method cleans the oxidation oven 1 in which the polyacrylonitrile-based precursor fiber for carbon fiber as described above is subjected to an oxidation treatment in an oxidizing atmosphere. Specifically, in the method of cleaning the oxidation oven 1 having a mechanism for circulating an oxidizing gas internally, the dust adhering to the wall surface of the oxidation oven 1 is caused to come in contact with a liquid so that pressure in a direction perpendicular to the wall surface is 2 MPa or more, and the liquid is then discharged out of the oxidation oven 1 to discharge the dust peeled off from the wall surface out of the oxidation oven 1. Furthermore, an oxidizing gas having a temperature of 40° C. or higher is circulated in the oxidation oven. When the pressure of the liquid in the direction perpendicular to the wall surface is less than 2 MPa during liquid cleaning, an impact force caused by the contact of the liquid is not sufficient to remove the dust adhering to the wall surface of the oxidation oven, which requires time for cleaning, and causes a poor removal effect even during long-time cleaning. Therefore, the pressure of the liquid coming in contact with the dust is essentially 2 MPa or more in the direction perpendicular to the wall surface, preferably 3 MPa or more, and more preferably 3.5 MPa or more. Meanwhile, in consideration of the saturation of the effects on the pressure, it is also preferable that the pressure is 10 MPa or less. The pressure acting on the dust adhering to the wall surface in the direction perpendicular to the wall surface may be obtained by measuring the pressure of the liquid coming in contact with the wall surface.

Time for causing the liquid to come in contact with the wall surface is appropriately determined depending on the degree of adhesion of the dust, but the time is preferably 1 second or more, and more preferably 3 seconds or more, for the same place. Meanwhile, in consideration of the saturation of the effects with respect to the time, the time is also preferably 1 minute or less.

The method of measuring the pressure of the liquid coming in contact with the wall surface is not particularly limited, but a pressure sensitive film (for example, Prescale LWPS or LLWPS manufactured by FUJIFILM Corporation) may be used.

The liquid used to clean is not particularly limited, but the liquid is preferably water in terms of economic efficiency. The water may contain an additive such as a surfactant, may be ion exchange water, or may be pure water.

In the cleaning method, the dust peeled off from the wall surface can also be discharged out of the oxidation oven 1 by discharging the liquid used for cleaning out of the oxidation oven 1. Therefore, at the bottom of the oxidation oven 1, it is preferable to provide an extracting port (not shown) for discharging the liquid used for cleaning out of the oxidation oven in a short time.

Figure 3:
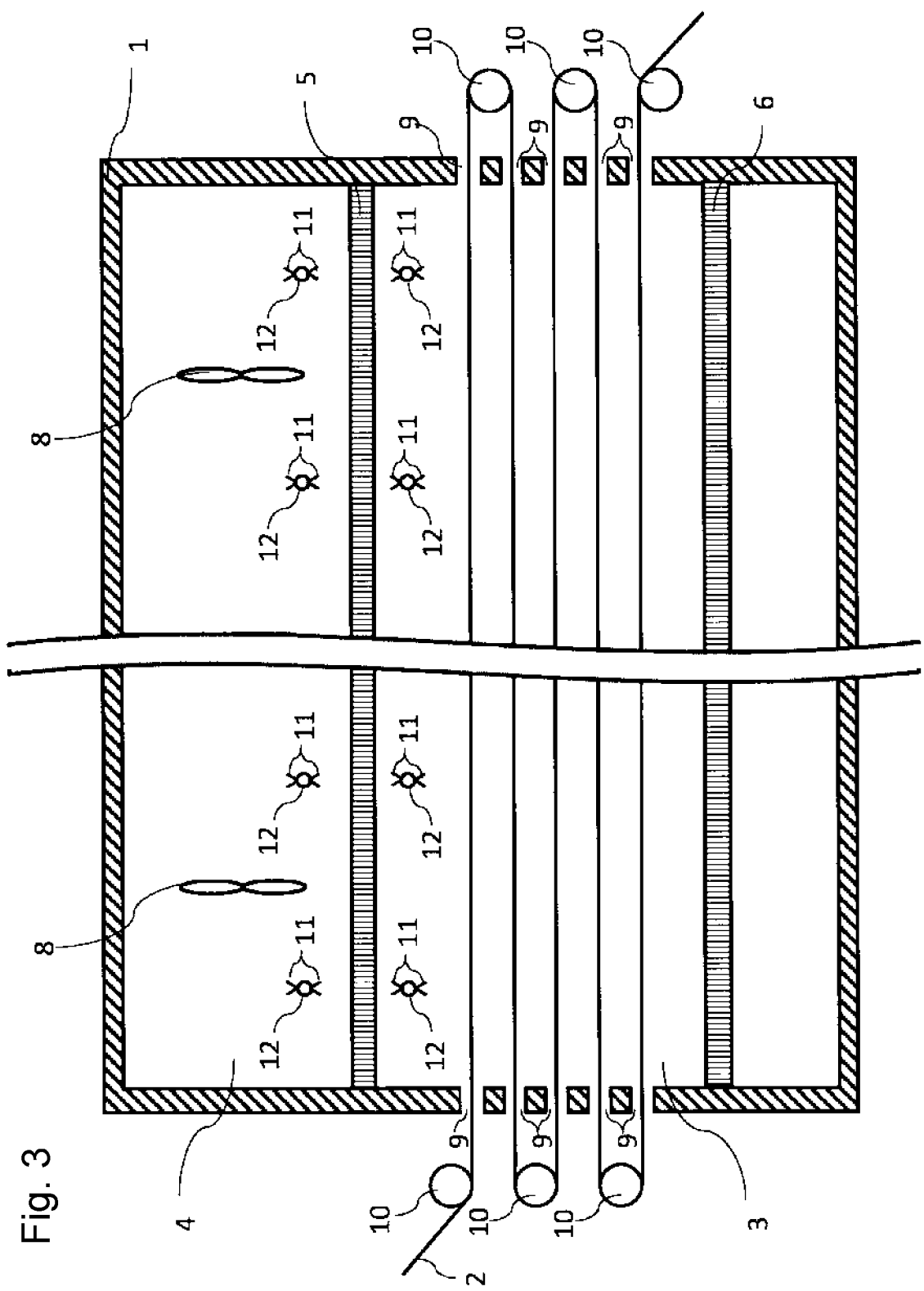
FIG. 3 is a schematic side view showing an oxidation oven including a cleaning device.
Figure 4:
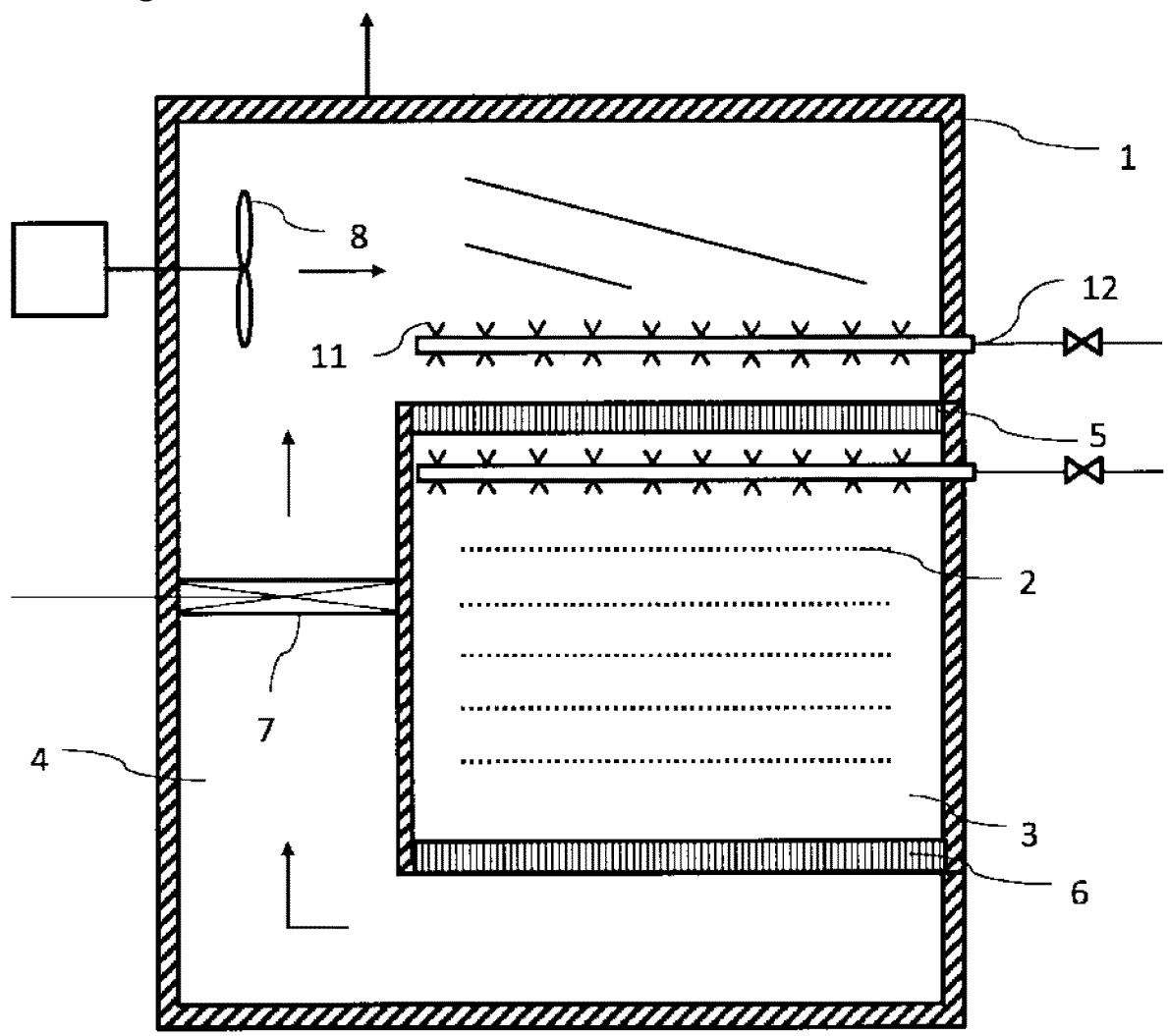
FIG. 4 is another schematic side view showing an oxidation oven including a cleaning device.

The cleaning method may be carried out in a state where the operators directly enter the oxidation oven. As shown in FIGS. 3 and 4, a cleaning device 12 including at least one cleaning nozzle 11 operable from the outside may be provided, and remotely operated. The cleaning device 12 may be installed anywhere in the oxidation oven 1, but the cleaning device 12 is more preferably installed in a flow path having a short side of 600 mm or less where it is difficult for the operators to directly enter and clean the oxidation oven.

After cleaning by the above method, when the oxidizing gas is circulated in the oxidation oven using the blower 8 and the like to dry the inside of the oxidation oven, the volume of the dust which cannot be removed and still adheres to the wall surface is changed, and the dust is peeled off, which can provide a more sufficient cleaning effect. In particular, if the oxidizing gas is the hot air, the dust is removed by a difference in thermal expansion coefficient between the oxidation oven 1 and the adhering dust and by impact due to a volume change occurring when moisture between the adhering dust and the wall surface of the oxidation oven is evaporated.

When the hot air is introduced, the temperature of the hot air measured by a thermometer installed in the heat treatment chamber 3 and the hot air circulation path 4 is essentially 40° C. or higher, preferably 60° C. or higher, and more preferably 80° C. or higher. Meanwhile, the upper limit thereof is preferably 200° C. or less, and more preferably 150° C. or less. It is preferable to heat the inside of the oxidation oven so that such a temperature range is set. The method of measuring the temperature is not particularly limited as long as the thermometer has a desired function and, for example, known thermometers such as a thermocouple may be used.

The method of heating and supplying the hot air is not particularly limited, but it is preferable to circulate the hot air in the oxidation oven 1 after heating by a known heater and the like to reduce the loss of thermal energy.

Since the circulated gas contains the peeled dust, it is preferable to discharge the entire amount of the gas out of the oxidation oven after the circulation of the gas. By discharging the circulated oxidizing gas out of the oxidation oven, the dust peeled off from the wall surface can be further discharged out of the oxidation oven.

Figure 6:
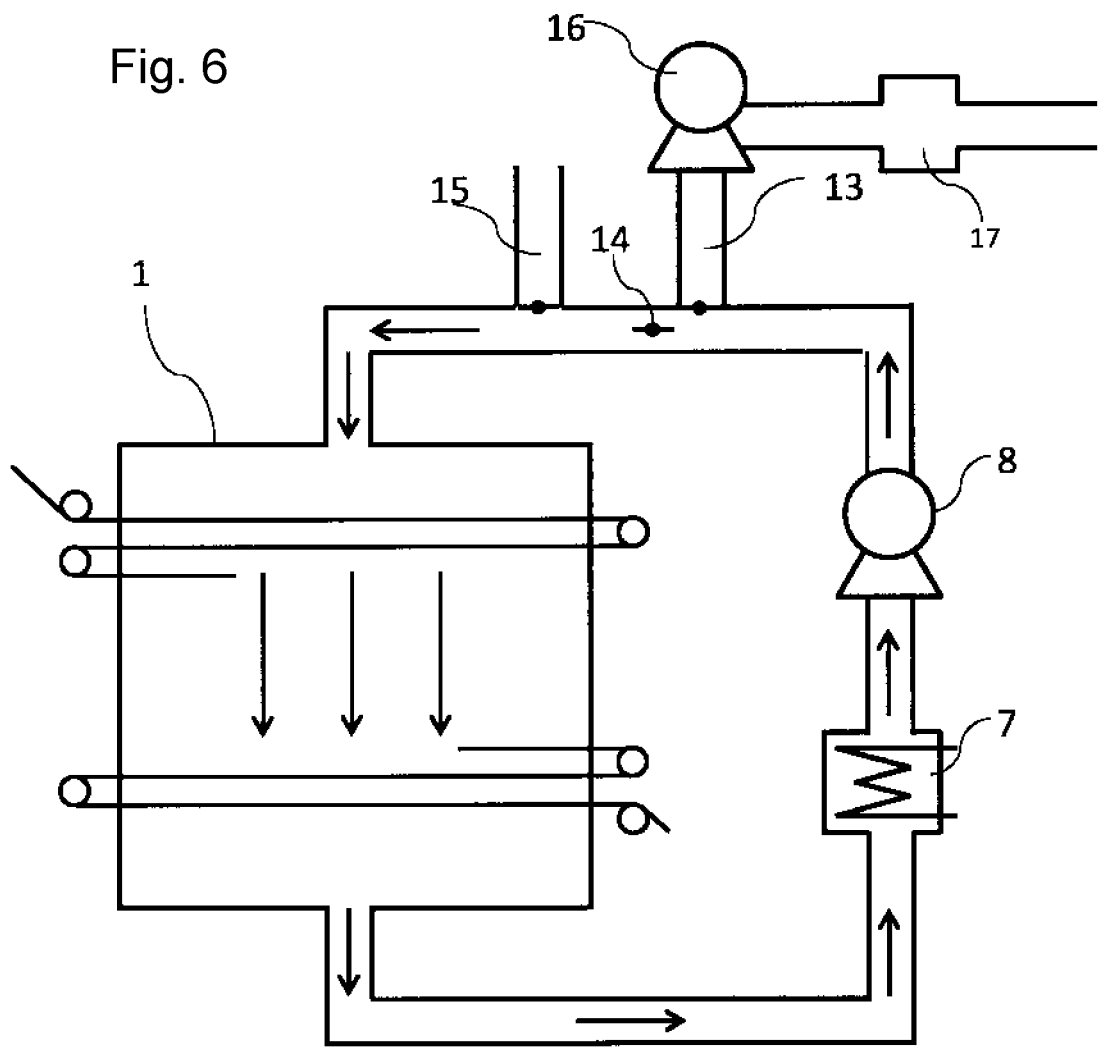
FIG. 6 is a schematic view showing an oxidation oven including an air supply port.

An impact force added to the adhering dust due to the change of the velocity of the oxidizing gas to be circulated effectively removes the dust adhering to the wall surface of the oxidation oven. Therefore, as shown in FIGS. 5 and 6, on the discharge side of the blower 8 for circulating the hot air into the oxidation oven 1, an exhaust port 13 including an open/close mechanism capable of discharging an air volume of 13 to 100% of the suction volume of the blower 8, and a switching valve 14 capable of shutting off communication between the exhaust port and a circulation duct are more preferably provided. To apply the impact force to the adhering dust, the direction may be changed instead of changing the velocity of the gas. The same effect can be achieved by changing the direction of the gas.

Furthermore, as shown in FIG. 7, to efficiently carry out fresh gas supply, it is preferable that a gas supply port 15 including an open/close mechanism is provided on the downstream side of the exhaust port 13, and a switching valve 14 capable of shutting off the communication of a circulation duct between the gas supply port 15 and the exhaust port 13 is provided.

As a method of changing the direction and velocity of the gas, a method of intermittently changing the number of rotations of the blower 8 using a programming controller, or a method of ejecting a gas using a gas injection device installed in the heat treatment chamber 3 or the hot air circulation path 4 in advance may be used.

Contact of surface to be cleaned with a fluid of 2 MPa or more in a direction perpendicular to the surface, drying of the inside of the oxidation oven after cleaning, and circulating of the gas, switching of the direction of the gas, and discharging of the gas out of the oxidation oven may be performed plural times. The number of times thereof is not limited.

Thus, the cleaning method of efficiently removing the dust adhering to the inside of the oxidation oven after the carbon fiber is produced is performed, whereby the dust adhering to the inside of the oxidation oven as the drawback of the hot air circulation system is easily removed while the hot air circulation type oxidation oven having less loss of thermal energy is used. Therefore, since the time and effort required for cleaning the inside of the oxidation oven can be reduced, the maintenance cost can be significantly reduced as compared with the cleaning of a conventional oxidation oven. By reducing the amount of the adhering dust remaining in the oxidation oven without being sufficiently cleaned, the long-term continuous operation of the oxidation oven becomes possible, whereby the productivity of the oxidized fiber can be improved. Furthermore, the deterioration in the quality of the carbon fiber and oxidized fiber due to the rescattering, immediately after re-operation, of the adhering dust remaining in the oxidation oven without being sufficiently cleaned can be suppressed, whereby the high-quality carbon fiber and oxidized fiber can be uniformly and stably produced immediately after the start of operation.

Above, a so-called horizontal type oxidation oven has been described, but the cleaning method can be carried out in just the same manner in a vertical type oxidation oven in which the heat treatment chamber 3 extends in a vertical direction.

The cleaning method may be carried out in each of a plurality of oxidation ovens in a method of producing a carbon fiber using the plurality of oxidation ovens, but most of the volatile matter derived from the silicone oil agent is initially generated in an oxidation treatment. Therefore, the cleaning method of the oxidation oven is preferably used for cleaning an oxidation oven which performs at least a first oxidation treatment. Thereby, the dust generated by the volatile substance from the precursor fiber for carbon fiber 1 and adhering to the inside of the oxidation oven 1 can be efficiently removed from the inside of the oxidation oven 1, and the deterioration in the quality of the carbon fiber immediately after the re-operation of producing apparatus can be suppressed. Therefore, the use of the cleaning method allows the long-term continuous operation of the plurality of oxidation ovens even when the plurality of oxidation ovens are used.

Next, a method of producing a carbon fiber using the oxidation oven 1 cleaned by using the cleaning method will be described.

As the precursor fiber for carbon fiber used for the method of producing the carbon fiber, a polyacrylonitrile-based fiber is used. The polyacrylonitrile-based fiber is obtained by dissolving an acrylonitrile-based polymer in an organic solvent or an inorganic solvent, and spinning the fiber according to a commonly used method, and the spinning method and the spinning condition are not particularly limited.

The silicone based oil agent to be applied to the polyacrylonitrile-based fiber needs to contain an amino-modified silicone in at least a part thereof. The adhesion amount of the silicone based oil agent to be applied to the polyacrylonitrile-based fiber is preferably 0.05 to 3% by mass, and more preferably 0.3 to 1.5% by mass. A surfactant and a heat stabilizer and the like may be further added to the silicone based oil agent. As the kind of the silicone based oil agent, dimethylsiloxanes and those obtained by modifying them with a functional group are preferably used. Those containing amino-modified dimethylsiloxane modified with an amino group as an essential component, and those mixed with polyethylene oxide-modified dimethylsiloxane, or epoxy modified dimethylsiloxane to improve thermal stability are more preferable.

The polyacrylonitrile-based fiber thus obtained is heat-treated at a maximum temperature of 200 to 300° C. to subject the polyacrylonitrile-based fiber to an oxidation treatment.

In the heat treatment oven for the oxidation treatment, fine particles such as dust generated by heating and oxidizing the silicone based oil agent, and fine particles such as particles or dust containing metallic elements from the apparatus and peripheral air around the heat treatment oven stay in the oxidation oven during the continuous production of the carbon fiber, which causes deterioration in quality. More specifically, it is known that, when an oxidized fiber suitable for obtaining a carbon fiber having high tensile strength, and a carbon fiber using the oxidized fiber are produced, fine particles having a particle size of 0.3 μm or more adhere to the surface of the carbon fiber, or flaws of 0.3 μm or more are formed on the surface of the oxidized fiber by the fine particles, which causes reduction in tensile strength of the carbon fiber. To stably produce the carbon fiber having high tensile strength, it is preferable that the total number of fine particles having a particle diameter of 0.3 μm or more and flaws of 0.3 μm or more on the surface of the oxidized fiber is preferably 20 pieces/0.1 mm$^2$ or less, and more preferably 15 pieces/0.1 mm$^2$ or less.

It is preferable to clean the oxidation oven when the number of the fine particles and flaws on the surface of the oxidized fiber exceeds the above number, and the above number may not be necessarily measured every time. For example, the cleaning may be carried out at predetermined intervals set in advance on the basis of time when it is considered that the number of the fine particles and flaws on the surface of the oxidized fiber exceeds a predetermined number.

An oxidizing gas such as air is used for the hot air circulated in the oxidation oven. The oxidizing gas preferably contains fewer fine particles such as the dust, but the fine particles are constantly generated in the oxidizing gas, and adhere for the reasons described above, which makes it industrially difficult to reduce the concentration to zero. Therefore, it is preferable to filter the outside air when taking in the outside air to be supplied into the oxidation oven, and to use a material which is resistant to rust such as stainless steel as the material of a metal portion used for the apparatus. It is preferable that the amount of the silicone based oil agent to be used is suppressed low so that desired physical properties are exhibited, or the decomposition of a silicone based oil agent in the oxidation oven is suppressed by using the silicone based oil agent containing an amino-modified silicone having excellent heat resistance, whereby the concentration of the fine particles is kept at 2500 particles/L or less. By these, the tensile strength level of the obtained carbon fiber can be maintained at a high level. The concentration of the fine particles can also be reduced as much as possible by subjecting most of the circulated oxidizing gas to a dust collection treatment, but in view of equipment and operation cost, it is preferable that the inside of the oxidation oven is efficiently cleaned in a state where the operation of the oxidation oven is stopped, to reduce the amount of the dust in the oxidation oven.

A light scattering particle counter (for example, KC-01E, manufactured by RION Corporation) can be used to measure the concentration of the fine particles. That is, a gas is suctioned at a sample gas flow rate of 0.5 L/min for 34 seconds. The number of the particles contained in the gas of 0.283 L is simultaneously measured in four ranges of 0.5 μm or more and less than 1.0 μm, 1.0 μm or more and less than 2.0 μm, 2.0 μm or more and less than 5.0 μm, and 5.0 μm or more. The values are taken as $D_{0.5}$, $D_{1.0}$, $D_{2.0}$, and $D_{5.0}$ (particles/0.283 L). A value obtained by converting the particle concentration into the number of particles of 5.0 μm according to the following conversion formula is taken as a fine particle concentration:

Conversion formula to the number of particles of 5.0 μm=$[\{D_{0.5}/(5.0/0.5)\}+\{D_{1.0}/(5.0/1.0)\}+\{D_{2.0}/(5.0/2.0)\}+D_{5.0}]/0.283$(particles/L).

The precursor fiber for carbon fiber 2 is subjected to an oxidation treatment in an oxidizing atmosphere, specifically, in hot air at a maximum temperature of 200 to 300° C. under a tension or stretching condition. Basically, it is preferable to perform the oxidation treatment until the density of the oxidized fiber after the oxidation treatment is set to 1.30 g/cm³ to 1.40 g/cm³. If the density is less than 1.30 g/cm³, the degree of progress of the oxidation is insufficient, and adhesion between the single yarns are apt to occur during the precarbonization treatment and the carbonization treatment performed after the oxidation treatment, which is apt to cause deterioration in quality of the obtained carbon fiber. When the density of the oxidized fiber exceeds 1.40 g/cm³, oxygen is excessively introduced to the oxidized fiber during the precarbonization treatment and the carbonization treatment so that the final internal structure of the carbon fiber is not dense, which is apt to cause deterioration in quality of the obtained carbon fiber.

Meanwhile, in carbonizing the oxidized fiber to produce a heat-resistant product such as a flame-retardant woven fabric, the density of the oxidized fiber used therefor may exceed 1.40 g/cm³. However, if the density exceeds 1.50 g/cm³, time for carbonizing the oxidized fiber is long, which is not preferable from an economical viewpoint. Therefore, it is preferable to perform an oxidation treatment to be within the range of 1.30 g/cm³ to 1.50 g/cm³. 0

The hot air (oxidizing atmosphere) filling the heat treatment chamber 3 of the oxidation oven 1 for carrying out the cleaning method is not particularly limited as long as it is a gas containing oxygen, but in terms of industrial production, it is particularly excellent to use air in terms of economy and safety. The concentration of oxygen in the hot air can also be changed to adjust the oxidation capacity.

The oxidized fiber obtained by the oxidation treatment is subjected to a precarbonization treatment at a maximum temperature of 300 to 1000° C. in an inert gas to produce a precarbonized fiber, and subjected to a carbonization treatment at a maximum temperature of 1000 to 2000° C. in an inert gas to produce a carbon fiber. Furthermore, after the carbon fiber is produced, the carbon fiber can be subjected to a graphitization treatment at a maximum temperature of 2000 to 3000° C. in an inert gas to produce a graphitized fiber.

The maximum temperature of the inert gas in the precarbonization treatment is preferably 550 to 800° C. As the inert gas filling the precarbonization furnace, known inert gases such as nitrogen, argon, and helium can be adopted, but nitrogen is preferable in terms of economic efficiency.

The precarbonized fiber obtained by the precarbonization treatment is then fed to a carbonization furnace to subject the precarbonized fiber to a carbonization treatment. To improve the mechanical properties of the carbon fiber, it is preferable to subject the carbon fiber to the carbonization treatment at a maximum temperature of 1200 to 2000° C. in an inert gas.

Known inert gases such as nitrogen, argon, and helium can be employed as the inert gas filling the carbonization furnace, and nitrogen is preferable in terms of economic efficiency.

The carbon fiber thus obtained may be subjected to a graphitization treatment at a maximum temperature of 2000 to 3000° C. in an inert gas, as necessary. A sizing agent may be applied to improve the handleability of the carbon fiber and the affinity with a matrix resin. The type of the sizing agent is not particularly limited as long as desired properties can be obtained, and examples thereof include sizing agents mainly containing an epoxy resin, a polyether resin, an epoxy-modified polyurethane resin, and a polyester resin. Known methods can be used to apply the sizing agent.

Furthermore, the carbon fiber may be subjected to an electrolytic oxidation treatment or an oxidation treatment for the purpose of improving the affinity and adhesion to a fiber-reinforced composite material matrix resin, as necessary.

As described above, after the dust adhering to the inside of the oxidation oven is caused to come in contact with the fluid having pressure of 2 MPa or more, the oxidizing gas having a temperature of 40° C. or higher is circulated in the oxidation oven, and the dust peeled off from the wall surface is discharged out of the oxidation oven, whereby the dust adhering to the inside of the oxidation oven can be efficiently removed. As a result, the working time required to remove the dust in a state where the production of the oxidized fiber is stopped can be reduced, whereby the productivity of the oxidized fiber can be improved, and the maintenance cost can also be reduced. The stay of the dust in the oxidation oven is reduced, which makes it possible to obtain the oxidized fiber with no yarn break. This makes it possible to produce the high-quality carbon fiber from the initial stage of restart of the oxidation oven 1.

EXAMPLES

Hereinafter, our methods will be more specifically described by Examples, but this disclosure is not limited thereto. The methods of evaluation and measurement of characteristics were based on methods to be described later.
Measurement of Pressure of Fluid Coming in Contact with Wall Surface Pressure of a fluid coming in contact with a wall surface in a direction perpendicular to the wall surface was measured in a state where Prescales LWPS and LLWPS manufactured by FUJIFILM Corporation were fixed on the wall surface, covered with a waterproof sheet, and the fluid was caused to evenly come in contact with the wall surface in a direction perpendicular to the wall surface. Thereafter, the Prescales LWPS and LLWPS were removed, and the contrasting densities of the colors of the Prescales LWPS and LLWPS were read using a scanner GT-F740GT-X830 manufactured by Epson. The contact pressure of the wall surface was measured by using a Prescale pressure image analysis system FPD-8010J manufactured by FUJIFILM Corporation. This pressure measurement was performed at five places. The maximum value among the obtained pressure values was adopted as contact pressure in the direction perpendicular to the wall surface.
Measurement of Number of Fine Particles Adhering to Oxidized Fiber and of Flaws The oxidized fiber was cut out to a length of about 3 cm, and fixed to a sample stage for electron microscope using a carbon tape to not move. At this time, the yarn was thinly and uniformly spread, and fixed so that the sample stage was not to be observed and so to reduce overlapping of single yarns as much as possible. After the single yarn was deposited with a platinum palladium alloy for 30 seconds by using an ion sputter (for example, E-1030, manufactured by Hitachi High-Technologies Corporation), the surface of the single yarn was observed (one field of view: 42 μm×32 μm) at an accelerating voltage of 5.0 kV at a magnification of 3000 times by a scanning electron microscope (SEM; for example, S4800, manufactured by Hitachi High-Technologies Corporation), and the number of fine particles having a particle diameter of 0.3 μm or more and the number of flaws of 0.3 μm or more were counted. The particle size of a particle was represented by the length of a minor axis when the particle was approximated to be elliptical according to the least squares method, and the size of the flaw was also represented by the length of a minor axis when the flaw was approximated to be elliptical according to the least squares method. This observation was repeated at 1000 observation points, and the number of observed dusts was divided by the total observation area to convert the value to the number of the fine particles per 0.1 mm².

Example 1

A copolymer obtained by copolymerizing 99 mol % of acrylonitrile and 1 mol % of itaconic acid was treated by a solution polymerization method to obtain a spinning undiluted solution. The spinning undiluted solution was coagulated by a dry-jet wet spinning method in which the solution is discharged into air once using a spinneret and is introduced into a coagulation bath. The obtained coagulated yarn is cleaned with water, stretched, treated by an oil agent, dried, and then steam-stretched to obtain a polyacrylonitrile-based precursor fiber for carbon fiber having a single yarn fineness of 1.1 Dtex and 10,000 single yarns. The oil agent obtained by mixing, in pure equal amount, an amino-modified dimethylsiloxane oil agent component as a water dispersion system using a nonionic surfactant, with a water-soluble oil agent obtained by modifying dimethylpolysiloxane with polyethylene glycol was used.

The precursor fiber for carbon fiber was continuously fed into an oxidation oven 1 shown in FIGS. 1 and 6 to subject the precursor fiber for carbon fiber to an oxidation treatment.

A temperature in a heat treatment chamber 3 was set to 250° C., and a precursor fiber for carbon fiber 2 was subjected to an oxidation treatment under strain.

A porous plate made of SUS304 as a rectifying plate, having a large number of holes having a diameter of 10 mm, and having a thickness of 2 mm was provided in a hot air blowout port 5 in the oxidation oven 1 where the polyacrylonitrile precursor fiber for carbon fiber 2 to which a silicone based oil agent adhered was subjected to the oxidation treatment under the above oxidation treatment condition, and the oxidation treatment was continuously performed for one week. The obtained oxidized fiber was then carbonized at a maximum temperature of 700° C. in a precarbonization furnace, then carbonized at a maximum temperature of 1400° C. in a carbonization furnace, and subjected to an electrochemical treatment of fiber surface and sizing to obtain a carbon fiber.

After the continuous oxidation treatment for one week, the oxidation oven 1 was stopped, and high pressure water was uniformly supplied to a wall surface in the oxidation oven from a position distant by 5.2 m in a perpendicular direction from a surface to be cleaned, using a high pressure washer TRY-5NX2 manufactured by Arimitsu Industrial Co., Ltd., and the high pressure water was caused to come in contact with the wall surface for cleaning. At this time, the pressure of the cleaning water coming in contact with the wall surface to be cleaned was 2 MPa in a direction perpendicular to the wall surface. For measurement of pressure, Prescale LWPS manufactured by FUJIFILM Corporation was used. It took 10 hours to clean the entire oxidation oven, and the cleaning water was discharged out of the oxidation oven. Thereafter, hot air of 80° C. was circulated in the oxidation oven 1 using a blower 8 to dry the inside of the oxidation oven.

Dust adhering to the porous plate was confirmed to be removed by the cleaning, and the oxidation oven 1 was restarted to subject the precursor fiber for carbon fiber 2 to an oxidation treatment. After the continuous treatment for six weeks, the inside of the oxidation oven was confirmed, and the porous plate installed in the hot air blowout port 5 was not clogged.

During the continuous production period, carbon fiber production processability was good.

As the measurement results, the number of fine particles adhering to the oxidized fiber obtained after one week from the operation start and flaws was 18 pieces/0.1 mm².

Example 2

After a continuous oxidation treatment for one week, an oxidation oven 1 was stopped, and high pressure cleaning, discharging of cleaning water and drying were performed as in Example 1. Then, as shown in FIG. 5, a part of a circulating system duct of an oxidation oven was shut off by a switching valve 14, and an exhaust port 13 and an air supply port 15 were opened, to discharge dust in the oxidation oven by a force from a blower 8. At this time, the air volume of 90% of the suction air volume of the blower was exhausted, and the same amount of fresh air was taken in. By this operation, the velocity in the oxidation oven changed momentarily. Thereafter, the oxidation oven 1 was restarted to subject a precursor fiber for carbon fiber 2 to an oxidation treatment. After the continuous treatment for eight weeks, the inside of the oxidation oven was confirmed, and a porous plate installed in a hot air blowout port 5 was not clogged.

During the continuous production period, carbon fiber production processability was good.

As the measurement results, the number of fine particles adhering to the oxidized fiber obtained after one week from the operation start and flaws was 14 pieces/0.1 mm².

Example 3

After a continuous oxidation treatment for one week, an oxidation oven 1 was stopped, and Example 3 was performed in the same manner as in Example 2 except that high pressure water was supplied to a wall surface in the oxidation oven from a position distant by 4.3 m in a perpendicular direction from a surface to be cleaned, to carry out cleaning. At this time, the pressure of the cleaning water coming in contact with the wall surface to be cleaned was 3 MPa in a direction perpendicular to the wall surface. For measurement of pressure, Prescale LLWPS manufactured by FUJIFILM Corporation was used. It took 8 hours to clean the entire oxidation oven. The oxidation oven 1 was restarted to subject a precursor fiber for carbon fiber 2 to an oxidation treatment. After the continuous treatment for nine weeks, the inside of the oxidation oven was confirmed, and a porous plate installed in a hot air blowout port 5 was not clogged.

During the continuous production period, carbon fiber production processability was good.

As the measurement results, the number of fine particles adhering to the oxidized fiber obtained after one week from the operation start and flaws was 12 pieces/0.1 mm².

Example 4

After a continuous oxidation treatment for one week, an oxidation oven 1 was stopped, and Example 4 was performed in the same manner as in Example 3 except that the temperature of hot air circulated in the oxidation oven 1 was set to 100° C. Thereafter, the oxidation oven 1 was restarted to subject a precursor fiber for carbon fiber 2 to an oxidation treatment. After the continuous treatment for ten weeks, the inside of the oxidation oven was confirmed, and a porous plate installed in a hot air blowout port 5 was not clogged.

During the continuous production period, carbon fiber production processability was good.

As the measurement results, the number of fine particles adhering to the oxidized fiber obtained after one week from the operation start and flaws was 10 pieces/0.1 mm$^2$.

Example 5

After a continuous oxidation treatment for one week, an oxidation oven 1 was stopped, and high pressure cleaning, discharging of cleaning water, drying of the inside of the oxidation oven by hot air circulation, exhausting (discharging of dust), and taking in of fresh air as in Example 3 were performed. Then, before restart of the oxidation oven 1, high pressure cleaning, discharging of cleaning water, drying the inside of the oxidation oven by hot air circulation, exhausting (discharging of dust), and taking in of fresh air as in Example 3 were performed. Thereafter, the oxidation oven 1 was restarted to subject a precursor fiber for carbon fiber 2 to an oxidation treatment. After the continuous treatment for eleven weeks, the inside of the oxidation oven was confirmed, and a porous plate installed in a hot air blowout port 5 was not clogged.

During the continuous production period, carbon fiber production processability was good.

As the measurement results, the number of fine particles adhering to the oxidized fiber obtained after one week from the operation start and flaws was 10 pieces/0.1 mm$^2$.

Example 6

After a continuous oxidation treatment for one week, an oxidation oven 1 was stopped, and high pressure cleaning, discharging of cleaning water, drying of the inside of the oxidation oven by hot air circulation, exhausting (discharging of dust), and taking in of fresh air as in Example 4 were performed. Then, before restart of the oxidation oven 1, high pressure cleaning, discharging of cleaning water, drying the inside of the oxidation oven by hot air circulation, exhausting (discharging of dust), and taking in of fresh air as in Example 4 were performed. Thereafter, the oxidation oven 1 was restarted to subject a precursor fiber for carbon fiber 2 to an oxidation treatment. After the continuous treatment for twelve weeks, the inside of the oxidation oven was confirmed, and a porous plate installed in a hot air blowout port 5 was not clogged.

During the continuous production period, carbon fiber production processability was good.

As the measurement results, the number of fine particles adhering to the oxidized fiber obtained after one week from the operation start and flaws was 8 pieces/0.1 mm$^2$.

Comparative Example 1

After a continuous oxidation treatment for one week, an oxidation oven 1 was stopped, and hot air of 20° C. was circulated in the oxidation oven 1 using a blower 8 before restart of the oxidation oven 1. Then, as shown in FIG. 5, a part of a circulation system duct of the oxidation oven was shut off by a switching valve 14, and an exhaust port 13 and an air supply port 15 were opened to discharge dust in the oxidation oven by a force from a blower 8. At this time, the air volume of 90% of the suction air volume of the blower 8 was exhausted, and the same amount of fresh air was taken in. Thereafter, the oxidation oven 1 was restarted to subject a precursor fiber for carbon fiber 2 to an oxidation treatment.

However, when the oxidation oven 1 was continuously operated for two weeks, the operation was stopped because yarn break occurred in the oxidation oven. After stopping the operation, the inside of the oxidation oven 1 was confirmed, and a plurality of portions clogged in a porous plate installed in a hot air blowout port 5 were confirmed.

As in Example 1, as the measurement results, the number of fine particles adhering to the oxidized fiber obtained after one week from the operation start and flaws was 43 pieces/0.1 mm$^2$.

Comparative Example 2

After a continuous oxidation treatment for one week, an oxidation oven 1 was stopped, and Comparative Example 2 was performed in the same manner as in Example 2 except that high pressure water was supplied to a wall surface in the oxidation oven from a position distant by 6.2 m in a perpendicular direction from a surface to be cleaned, to carry out cleaning. At this time, the pressure of the cleaning water coming in contact with the wall surface to be cleaned was 1 MPa in a direction perpendicular to the wall surface. For measurement of pressure, Prescale LLWPS manufactured by FUJIFILM Corporation was used. The inside of the oxidation oven was cleaned for 24 hours, but dust which could not be cleaned remained on the wall surface of the oxidation oven.

The oxidation oven 1 was restarted to subject a precursor fiber for carbon fiber 2 to an oxidation treatment. However, when the oxidation oven 1 was continuously operated for two weeks, the operation was stopped because yarn break occurred in the oxidation oven. After stopping the operation, the inside of the oxidation oven 1 was confirmed, and a plurality of portions clogged in a porous plate installed in a hot air blowout port 5 were confirmed.

As in Example 1, as the measurement results, the number of fine particles adhering to the oxidized fiber obtained after one week from the operation start and flaws was 33 pieces/0.1 mm$^2$.

Comparative Example 3

After a continuous oxidation treatment for one week, an oxidation oven 1 was stopped, and Comparative Example 3 was performed in the same manner as in Example 3 except that the temperature of hot air circulated in the oxidation oven 1 was set to 20° C. Thereafter, the oxidation oven 1 was restarted to subject a precursor fiber for carbon fiber 2 to an oxidation treatment. Dust which could not be cleaned remained on the wall surface of the oxidation oven.

The oxidation oven 1 was restarted to subject a precursor fiber for carbon fiber 2 to an oxidation treatment. However, when the oxidation oven 1 was continuously operated for 3 weeks, the operation was stopped because yarn break occurred in the oxidation oven. After stopping the operation, the inside of the oxidation oven 1 was confirmed, and a plurality of portions clogged in a porous plate installed in a hot air blowout port 5 were confirmed.

As in Example 1, as the measurement results, the number of fine particles adhering to the oxidized fiber obtained after one week from the operation start and flaws was 25 pieces/ 0.1 mm$^2$.

Comparative Example 4

After a continuous oxidation treatment for one week, an oxidation oven 1 was stopped, and Comparative Example 4 was performed in the same manner as in Comparative Example 1 except that the temperature of hot air circulated in the oxidation oven 1 was changed to 80° C. Thereafter, the oxidation oven 1 was restarted to subject a precursor fiber for carbon fiber 2 to an oxidation treatment. Dust which could not be cleaned remained on the wall surface of the oxidation oven.

The oxidation oven 1 was restarted to subject a precursor fiber for carbon fiber 2 to an oxidation treatment. However, when the oxidation oven 1 was continuously operated for two weeks, the operation was stopped because yarn break occurred in the oxidation oven. After stopping the operation, the inside of the oxidation oven 1 was confirmed, and a plurality of portions clogged in a porous plate installed in a hot air blowout port 5 were confirmed.

As in Example 1, as the measurement results, the number of fine particles adhering to the oxidized fiber obtained after one week from the operation start and flaws was 40 pieces/ 0.1 mm$^2$.

TABLE 1

|  | Cleaning condition | | | | | Effects | |
| --- | --- | --- | --- | --- | --- | --- | --- |
|  | Pressure of water coming in contact with wall surface in perpendicular direction MPa | Number of times of cleaning Number of times | Presence or absence of gas circulation Presence or absence | Temperature of circulating gas ° C. | Switching of circulation and exhaustion Presence or absence | Continuous production period after cleaning Weeks | Total number of fine particles adhering to oxidized fiber bundle obtained after one week continuous production and flaws Pieces/0.1 mm$^2$ |
| Example 1 | 2 | 1 | Presence | 80 | Absence | 6 | 18 |
| Example 2 | 2 | 1 | Presence | 80 | Presence | 8 | 14 |
| Example 3 | 3 | 1 | Presence | 80 | Presence | 9 | 12 |
| Example 4 | 3 | 1 | Presence | 100 | Presence | 10 | 10 |
| Example 5 | 3 | 2 | Presence | 80 | Presence | 11 | 10 |
| Example 6 | 3 | 2 | Presence | 100 | Presence | 12 | 8 |
| Comparative Example 1 | — | 0 | Presence | 20 | Presence | 2 | 43 |
| Comparative Example 2 | 1 | 1 | Presence | 80 | Presence | 2 | 33 |
| Comparative Example 3 | 3 | 1 | Presence | 20 | Presence | 3 | 25 |
| Comparative Example 4 | — | 0 | Presence | 80 | Presence | 2 | 40 |

According to the comparison between the above Examples and Comparative Examples, it was evaluated that, since the cleaning method can remove the dust generated in the oxidation treatment of the precursor fiber for carbon fiber and adhering to the inside of the oxidation oven, the time until the porous plate is blocked is longer than that in the conventional cleaning method, which allows long-term continuous operation of the oxidation oven.

INDUSTRIAL APPLICABILITY

A method of cleaning an oxidation oven can be suitably used for producing an oxidized fiber and a carbon fiber.

The invention claimed is:

1. A method of cleaning an oxidation oven that subjects a polyacrylonitrile-based precursor fiber for carbon fiber to an oxidation treatment in an oxidizing atmosphere, wherein
   the oxidation oven has a mechanism for circulating an oxidizing gas internally,
   the method comprising the steps of:
   causing a liquid to come in contact with dust adhering to a wall surface of the oxidation oven so that pressure in a direction perpendicular to the wall surface is 2 MPa or more;
   discharging the liquid out of the oxidation oven to discharge dust peeled off from the wall surface out of the oxidation oven; and
   circulating an oxidizing gas having a temperature of 40° C. or higher in the oxidation oven.

2. The method according to claim 1, wherein, after the oxidizing gas is circulated, the oxidizing gas is discharged out of the oxidation oven to further discharge the dust peeled off from the wall surface out of the oxidation oven.

3. The method according to claim 2, wherein, after the oxidizing gas is circulated in the oxidation oven, a direction or velocity of the oxidizing gas in the oxidation oven is switched, and thereafter the dust peeled off from the wall surface is discharged out of the oxidation oven.

4. The method according to claim 1, wherein the temperature of the oxidizing gas circulated in the oxidation oven is 80° C. or higher.

5. A method of producing an oxidized fiber, comprising the steps of:
   cleaning an oxidation oven according to the method according to claim 1; and
   subjecting a polyacrylonitrile-based precursor fiber for carbon fiber to an oxidation treatment at a maximum temperature of 200 to 300° C. in an oxidizing atmosphere in the oxidation oven.

6. A method of producing a carbon fiber, comprising the steps of:
   producing an oxidized fiber according to the method according to claim 5;
   subjecting the oxidized fiber to a precarbonization treatment at a maximum temperature of 300 to 1000° C. in an inert gas to produce a precarbonized fiber; and subjecting the precarbonized fiber to a carbonization treatment at a maximum temperature of 1000 to 2000° C. in an inert gas.

7. A method of producing a graphitized fiber, comprising the steps of:
   producing a carbon fiber according to the method according to claim 6; and
   subjecting the carbon fiber to a graphitization treatment at a maximum temperature of 2000 to 3000° C. in an inert gas.

* * * * *